(12) United States Patent
Bourrigaud et al.

(10) Patent No.: US 10,131,735 B2
(45) Date of Patent: *Nov. 20, 2018

(54) LOW-TEMPERATURE RADICAL POLYMERISATION OF ALKOXYAMINES

(71) Applicant: ARKEMA FRANCE, Colombes (FR)

(72) Inventors: Sylvain Bourrigaud, Morlanne (FR);
Sylvie Cazaumayou, Dax (FR); Pierre Escale, Talence (FR); Raber Inoubli, Pau (FR)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/536,453

(22) PCT Filed: Dec. 18, 2015

(86) PCT No.: PCT/FR2015/053616
§ 371 (c)(1),
(2) Date: Jun. 15, 2017

(87) PCT Pub. No.: WO2016/097646
PCT Pub. Date: Jun. 23, 2016

(65) Prior Publication Data
US 2018/0002472 A1    Jan. 4, 2018

(30) Foreign Application Priority Data
Dec. 18, 2014  (FR) .................................... 14 62720

(51) Int. Cl.
*C08F 293/00* (2006.01)
*C08F 4/34* (2006.01)
(Continued)

(52) U.S. Cl.
CPC ............ *C08F 293/005* (2013.01); *C08F 4/34* (2013.01); *C08F 220/10* (2013.01);
(Continued)

(58) Field of Classification Search
CPC ..... C08F 293/005; C09D 153/00; A61K 8/90; E21B 43/16
(Continued)

(56) References Cited

U.S. PATENT DOCUMENTS 5,728,747 A    3/1998  Kazmaier et al.
5,919,871 A    7/1999  Nicol et al.
(Continued)

FOREIGN PATENT DOCUMENTS

EP    0760824 A1    3/1997
EP    0814097 A2    12/1997
(Continued)

OTHER PUBLICATIONS

International Search Report and Written Opinion for International Application No. PCT/FR2015/053616, dated Mar. 24, 2016—7 Pages.
(Continued)

*Primary Examiner* — William K Cheung
(74) *Attorney, Agent, or Firm* — RatnerPrestia (57) ABSTRACT

The present invention relates to a process for the radical polymerization of alkoxyamines at low temperature, typically at temperatures as low as −50° C., in the presence of a photoinitiator.

21 Claims, 3 Drawing Sheets

Dynamic mechanical temperature analysis (51) Int. Cl.
*C09D 153/00* (2006.01)
*C09J 153/00* (2006.01)
*C08F 220/10* (2006.01)

(52) U.S. Cl.
CPC .......... *C09D 153/00* (2013.01); *C09J 153/00* (2013.01); *C08F 2438/02* (2013.01); *C08L 2205/04* (2013.01)

(58) Field of Classification Search
USPC .................. 524/547; 514/772.1; 166/305.1
See application file for complete search history.

(56) References Cited

U.S. PATENT DOCUMENTS

| | | | |
|---|---|---|---|
| 6,495,720 | B1 | 12/2002 | Couturier et al. |
| 9,527,108 | B2 | 12/2016 | Navarro et al. |
| 2002/0040117 | A1* | 4/2002 | Guerret .................... C08F 4/00 526/220 |
| 2006/0063891 | A1 | 3/2006 | Ruzette et al. |

FOREIGN PATENT DOCUMENTS

| | | |
|---|---|---|
| FR | 2791979 A1 | 10/2000 |
| JP | 2010174199 A | 8/2010 |
| WO | 03062293 A1 | 7/2003 |
| WO | 03074572 A1 | 9/2003 |
| WO | 2013083919 A1 | 6/2013 |

OTHER PUBLICATIONS

Griller et al., "Persistent Carbon-Centered Radicals", Accounts of Chemical Research, 1976, vol. 9, pp. 13-19.
Greszta et al.,"Mechanism of Controlled/"Living" Radical Polymerization of Styrene in the Presence of Nitroxyl Radicals. Kinetics and Simulations", Macromolecules, vol. 29, 1996, pp. 7661-7670.
Qiu et al., "Studies on the Organic Peroxide Ditertiary Amine Initiation Systems", Polymer Commuinications, No. 1, 1986, pp. 76-81.

* cited by examiner

LOW-TEMPERATURE RADICAL POLYMERISATION OF ALKOXYAMINES

CROSS-REFERENCE TO RELATED APPLICATION

This patent application is a U.S. National Phase Patent Application of PCT Application No. PCT/FR2015/053616, filed Dec. 18, 2015, which claims priority to French Patent Application No. 1462720, filed Dec. 18, 2014, each of which is incorporated by reference herein in its entirety for all purposes.

FIELD OF THE INVENTION

The present invention relates to a process for the radical polymerization of alkoxyamines at low temperature, typically at temperatures as low as −50° C., in the presence of a photoinitiator. The invention also relates to the use of the process of the invention for obtaining objects, and also to the objects obtained.

BACKGROUND OF THE INVENTION

Radical polymerization is a well-known polymerization technique. The use of alkoxyamines makes it possible to prepare block copolymers.

These polymerizations are almost always performed at temperatures at least higher than 100° C. An exception concerns the use of N-tert-butyl-1-diethylphosphono-2,2-dimethylpropyl nitroxide, also known as SG1, since it makes it possible to start the polymerization at 50° C. This nitroxide, the formula of which is recalled below, is more particularly described in EP 0 760 824:

Although this nitroxide has many advantages such as moderate polymerization temperatures and good control of many monomers, it does not allow polymerizations to be performed at low temperature such as room temperature (for instance 20° C.) or even below room temperature within times that are compatible with industrial cycles when it is derived from alkoxyamines, since the latter can only generate the persistent radical at temperatures above 50° C.

WO 03/074 572 describes the possibility of polymerizing in a controlled manner via the nitroxide route at temperatures of between 50° C. and 160° C., but preferably between 80° C. and 100° C. The reaction is thus not possible, for example, at room temperature.

Now, there is a real need to be able to perform polymerizations at such low temperatures, or even at negative temperatures, for example in the case of the polymerization of very large components (for example wind turbine blades or boat hulls) for which a heating installation of oven type is very expensive. A polymerization performed at room temperature or even at negative temperatures would thus be a major economical advance or would make it possible, for example in the case of multipack adhesives, for them to be usable under severe negative temperature conditions.

Moreover, in a formulation comprising block copolymers, the introduction of block copolymers synthesized in a preliminary step usually gives rise to a very significant increase in the viscosity of the mixture, which constitutes a major obstacle for processes requiring a low viscosity, such as infusion processes for the manufacture of composite materials, or high production-speed processes for which the rheological behavior of the preparation is crucial. It therefore appears judicious to prepare the block copolymer in situ, i.e. during the forming of the material, and to do so at low temperature (>0° C.), typically at room temperature, i.e. at about 25° C.

In other situations, low-temperature polymerization has advantages (limitation of side reactions, no degradation of certain heat-sensitive molecules), but also makes it possible to consume less energy or to minimize the pressure in the synthesis reactors.

In standard radical polymerization, it is well known, when the initiator used is a peroxide, that the addition of amines such as dimethyl-para-toluidine (Qiu K. et al., *Polymer Communications*, No. 1, 76-81, 1985) allows initiation at low temperature. This redox system is useful for preparing two-pack adhesives that can be used at room temperature, for example.

The Applicant has now discovered, contrary to all expectation, that an alkoxyamine, in the presence of a photoinitiator, re-initiates the polymerization of monomers under irradiation with electromagnetic radiation, and does so at negative temperatures, with rapid kinetics, i.e. with times that are compatible with industrial applications, typically from a few minutes to a few hours.

SUMMARY OF THE INVENTION

The invention relates to a radical polymerization process comprising the following steps:
- mixture comprising at least one monomer in the presence of at least one photoinitiator and at least one alkoxyamine,
- polymerization of the mixture at a temperature of between −50° C. and 80° C. until the monomers have been fully converted.

DETAILED DESCRIPTION

The process of the invention may be performed with any type of alkoxyamine. It may also be a poly-alkoxyamine, which is capable of generating several nitroxide radicals, or alternatively a macromolecular alkoxyamine or macromolecular poly-alkoxyamine derived from a step of polymerization between at least one monomer and an alkoxyamine.

Thus, according to a first embodiment of the invention, at least one of the alkoxyamines is monofunctional.

According to a second form of the invention, at least one of the alkoxyamines is multifunctional.

The alkoxyamine or the poly-alkoxyamine is described by the general formula $Z(-T)_n$ in which Z denotes a multivalent group, T a nitroxide and n an integer greater than or equal to 1, preferably between 2 and 10, advantageously between 2 and 8 and more preferably between 2 and 4, limits inclusive.

n represents the functionality of the alkoxyamine, i.e. the number of nitroxide radicals T that can be released by the alkoxyamine according to the mechanism:

This reaction is activated by the presence of a photoinitiator which, when subjected to electromagnetic radiation, generates free radicals. In the presence of monomer(s), the activated alkoxyamine initiates a polymerization. The scheme below illustrates the preparation of a copolymer polyM2-polyM1-polyM2 based on an alkoxyamine for which n=2. The monomer M1 is first polymerized after activation of the alkoxyamine, and, once the block polyM1 is complete, the monomer M2 is then polymerized:

The principle of the preparation of block copolymers remains valid for n greater than or equal to 1.

Z denotes a multivalent group, i.e. a group that can release several radical sites after activation. The activation in question takes place by cleavage of the covalent bond Z-T.

By way of example, Z may be chosen from groups (I) to (VIII) below:

in which $R_3$ and $R_4$, which may be identical or different, represent a linear or branched alkyl radical containing a number of carbon atoms ranging from 1 to 10, phenyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; a benzyl radical, a cycloalkyl radical containing a number of carbon atoms ranging from 3 to 12, a radical comprising one or more unsaturations; B represents a linear or branched alkylene radical containing a number of carbon atoms ranging from 1 to 20; m is an integer ranging from 1 to 10;

in which $R_5$ and $R_6$, which may be identical or different, represent aryl, pyridyl, furyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; D represents a linear or branched alkylene radical containing a number of carbon atoms ranging from 1 to 6, a phenylene radical or a cycloalkylene radical; p is an integer ranging from 1 to 10;

in which $R_7$, $R_8$ and $R_9$, which may be identical or different, have the same meanings as $R_3$ and $R_4$ of formula (I), q, r and s are integers ranging from 1 to 10;

in which $R_{10}$ has the same meaning as $R_5$ and $R_6$ of formula (II), t is an integer ranging from 1 to 4, u is an integer between 2 and 6 (the aromatic group is substituted);

in which $R_{11}$ has the same meaning as the radical $R_{10}$ of formula (IV) and v is an integer between 2 and 6;

in which $R_{12}$, $R_{13}$ and $R_{14}$, which may be identical or different, represent a phenyl radical, optionally substituted with a halogen atom such as Cl or Br, or alternatively with a linear or branched alkyl radical, containing a number of carbon atoms ranging from 1 to 10; W represents an oxygen, sulfur or selenium atom, w is equal to 0 or 1;

(VII)

in which $R_{15}$ has the same meaning as $R_3$ of formula (I), $R_{16}$ has the same meaning as $R_5$ or $R_6$ of formula (II);

(VIII)

in which $R_{17}$ and $R_{18}$, which may be identical or different, represent a hydrogen atom or a linear or branched alkyl radical containing a number of carbon atoms ranging from 1 to 10, an aryl radical, optionally substituted with a halogen atom or a heteroatom.

T denotes a nitroxide, which is a stable free radical bearing a group =N—O., i.e. a group on which an unpaired electron is present. The term "stable free radical" denotes a radical that is so persistent and unreactive toward atmospheric air and moisture that it can be handled and stored for a much longer time than the majority of free radicals (see in this respect *Accounts of Chemical Research* 1976, 9, 13-19). The stable free radical thus differs from free radicals whose lifetime is fleeting (from a few milliseconds to a few seconds) such as free radicals derived from the usual polymerization initiators, for instance peroxides, hydroperoxides or azo initiators. A free radical may be said to be stable if it is not a polymerization initiator and if the average lifetime of the radical is at least one minute.

T is represented by the structure:

(IX)

in which $R_{19}$, $R_{20}$, $R_{21}$, $R_{22}$, $R_{23}$ and $R_{24}$ denote groups from among:
linear or branched $C_1$-$C_{20}$ and preferably $C_1$-$C_{10}$ alkyls such as substituted or unsubstituted methyl, ethyl, propyl, butyl, isopropyl, isobutyl, tert-butyl or neopentyl,
substituted or unsubstituted $C_6$-$C_{30}$ aryls such as benzyl or aryl(phenyl)
saturated $C_1$-$C_{30}$ cyclics
and in which the groups $R_{19}$ and $R_{22}$ may form part of an optionally substituted cyclic structure $R_{19}$—CNC—$R_{22}$ which may be chosen from:

in which x denotes an integer between 1 and 12.

By way of example, use may be made of the following nitroxides:

TEMPO    OXO-TEMPO

The nitroxides of formula (X) are particularly preferably used:

(X)

$R_a$ and $R_b$ denoting identical or different alkyl groups bearing from 1 to 40 carbon atoms, optionally linked together so as to form a ring and optionally substituted with hydroxyl, alkoxy or amino groups, $R_L$ denoting a monovalent group with a molar mass of greater than 15.42 g/mol and preferably greater than 30 g/mol. The group $R_L$ may have, for example, a molar mass of between 40 and 450 g/mol. It is preferably a phosphorus-bearing group of general formula (XI):

(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

(XII)

in which $R_c$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

The nitroxides of formula (X) are preferred since they make it possible to obtain good control of the radical polymerization of the (meth)acrylic monomers, as is taught in WO 03/062 293. The alkoxyamines of formula (XIII) bearing a nitroxide of formula (X) are thus preferred:

(XIII)

in which:
Z denotes a multivalent group;
$R_a$ and $R_b$ denote identical or different alkyl groups bearing from 1 to 40 carbon atoms, optionally linked together so as to form a ring and optionally substituted with hydroxyl, alkoxy or amino groups;
$R_L$ denotes a monovalent group with a molar mass of greater than 15.042 g/mol and preferably greater than 30 g/mol. The group $R_L$ may have, for example, a molar mass of between 40 and 450 g/mol. It is preferably a phosphorus-bearing group of general formula (XI):

(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

(XII)

in which $R_c$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

By way of example of nitroxide of formula (X) that may be borne by the alkoxyamine (XIII), mention may be made of:
N-tert-butyl-1-phenyl-2-methylpropyl nitroxide,
N-(2-hydroxymethylpropyl)-1-phenyl-2-methylpropyl nitroxide,
N-tert-butyl-1-dibenzylphosphono-2,2-dimethylpropyl nitroxide,
N-tert-butyl-1-bis(2,2,2-trifluoroethyl)phosphono-2,2-dimethylpropyl nitroxide,
N-tert-butyl[(1-diethylphosphono)-2-methylpropyl] nitroxide,
N-(1-methylethyl)-1-cyclohexyl-1-(diethylphosphono) nitroxide,
N-(1-phenylbenzyl)-[(1-diethylphosphono)-1-methylethyl] nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphonomethylethyl nitroxide,
or alternatively the nitroxide of formula

The nitroxide of formula (XIV) is particularly preferred:

(XIV)

It is N-tert-butyl-1-diethylphosphono-2,2-dimethylpropyl nitroxide, commonly known for simplicity as SG1.

The alkoxyamine (I), and especially the alkoxyamine (XIII), may be prepared via recipes described, for example, in FR 2 791 979. One method that may be used consists in coupling a carbon-based radical with a nitroxide. The coupling may be performed starting with a halogenated derivative in the presence of an organometallic system such as CuX/ligand (X=Cl or Br) according to a reaction of ATRA (atom-transfer radical addition) type as described by D. Greszta et al. in *Macromolecules* 1996, 29, 7661-7670.

Alkoxyamines that may be used in the context of the invention are represented below:

DIAMS

-continued

The last two alkoxyamines are called DIAMINS and TRIAMINS, respectively, and are the preferred alkoxyamines.

It would not constitute a departure from the scope of the present invention to combine several alkoxyamines corresponding to formula (I), in particular several alkoxyamines of formula (XIII). These mixtures might thus comprise, for example, an alkoxyamine containing n1 attached nitroxides and an alkoxyamine containing n2 attached nitroxides with n1 being different from n2. They might also be a combination of alkoxyamines bearing different nitroxides.

Photoinitiators are compounds that are capable of generating free radicals when these compounds are exposed to electromagnetic radiation. Preferably, the electromagnetic radiations have wavelengths in the ultraviolet or visible range, but it would not constitute a departure from the scope of the invention to use wavelengths in shorter wavelength ranges (x-rays or gamma rays) or longer wavelength ranges (infrared or even beyond).

It may also be a photoinitiator that is capable of generating free radicals by absorption of at least two photons.

The latter example is particularly useful when it is a matter of selectively polymerizing an area of the mass of the reaction mixture, in particular in the fields of 3D printing involving polymerization in the presence of a photoinitiator, i.e. the creation of three-dimensional objects and of prototypes by polymerization of successive layers by means of a laser beam.

The photoinitiators may be of any type. They are preferably chosen from those which generate free radicals via a homolytic cleavage reaction in the α position relative to the carbonyl group, such as benzoin ether derivatives, hydroxyalkylphenones, dialkoxyacetophenones, and also acylphosphine oxide derivatives, and in the β position, such as ketone sulfides and sulfonyl ketone derivatives, which form free radicals by stripping hydrogen from a hydrogen donor, such as benzophenones or thioxanthones. The process involves a charge transfer complex with an amine, followed by electron and proton transfer to lead to the formation of an initiating alkyl radical and an inactive ketyl radical. Mention may be made of benzyldiacetals, hydroxyalkylphenones, α-amino ketones, acylphosphine oxides, benzophenones and thioxanthones. It would not constitute a departure from the scope of the invention to use a combination of several photoinitiators, or even a combination of photoinitiators and of radical initiator(s) in which the radicals are generated thermally or via a redox reaction, for instance the methylenebis (diethyl malonate)-cerium IV couple or alternatively the $H_2O_2/Fe^{2+}$ couple.

As initiators, mention may be made of diacyl peroxides, peroxy esters, dialkyl peroxides, peroxyacetals and azo compounds. Radical initiators that may be suitable for use are, for example, isopropyl carbonate, benzoyl, lauroyl, caproyl or dicumyl peroxide, tert-butyl perbenzoate, tert-butyl 2-ethyl perhexanoate, cumyl hydroperoxide, 1,1-bis (tert-butylperoxy)-3,3,5-trimethylcyclohexane, tert-butyl peroxyisobutyrate, tert-butyl peracetate, tert-butyl perpivalate, amyl perpivalate and tert-butyl peroctoate.

The process of the invention may also comprise various additives, such as plasticizers, heat or UV stabilizers, or colorants, depending on the final use of the object obtained by the use of the process of the invention.

The polymerization according to the process of the invention may be performed in bulk, solution, suspension or emulsion.

According to one variant of the invention, the alkoxyamine used may be prepared via a similar nitroxide-controlled radical polymerization process but without the presence of the photoinitiator, at a temperature above 50° C. It involves, for example, making a first block comprising at least one monomer, which will be subsequently placed under the conditions of the present invention, i.e. at low temperature, typically at room temperature to give rise to the polymerization of the other blocks. A copolymer with several blocks will thus be obtained.

The synthesis of block copolymers has been using several techniques for many years. In each of these techniques, the temperatures used for the synthesis are always very far from room temperature and thus require special preparation conditions, which are often incompatible with the manufacturing processes used in the applications. In the process of the invention, the polymerization temperatures are between −50° C. and +80° C., advantageously between −20° C. and +80° C., preferably between 0° C. and 80° C., more preferably between 0° C. and 50° C. and ideally between 10 and 35° C.

Numerous studies have consequently consisted in synthesizing the block copolymer in a first step, and then in introducing it in additive form into materials chosen according to the intended application. It has been demonstrated that the use of these additives makes it possible to obtain improved compromises between properties when compared with the prior techniques usually used. However, the introduction of block copolymers into a host material requires special mixing tools and techniques (at elevated temperature, via a solvent route) due to the very high viscosity of these additives. The same effect also limits the content of block copolymers that may be introduced into the final material. For these applications, the content of polymer that may be used as additive is limited by the viscosity generated. In the case where the synthesis of the copolymer takes place directly in a host resin, or the resin/hardener mixture, as may be the case in the present invention, the viscosity is no longer a problem since it arises only at the end of the process. This opens up new opportunities in fields in which the viscosity is a limiting factor such as coatings, resin injection or infusion processes, adhesives, etc.

The present invention has the twofold advantage of allowing the synthesis of the block copolymer in situ in the host material, so as to obtain a particular morphology that is more favorable toward applicative properties, while conserving a low initial viscosity that is particularly favorable toward the implementation of the admixed material.

The host material may be a solvent, a polymer, an oligomer, a porous or non-porous pigmentary or non-pigmentary filler of any size and of any type of aspect ratio, short or long, woven or nonwoven fibers, nanotubes, or a combination of these host materials. The host material may also be a polymer precursor, for example any two-pack or non-two-pack system that is capable of polymerizing independently of the polymerization involving the alkoxyamine, for example, in a nonlimiting manner, a polyester, polyurethane or epoxy resin. It is possible, for example, to polymerize either simultaneously or sequentially the host material and the material derived from the polymerization of the alkoxyamine.

In this sense, the present invention is similar to the processes described in WO 03/062 293 or WO 06/06152, but differs from the latter in the fact that the temperature for synthesizing the second block is very significantly lower than those described in the prior art, typically at room temperature, which is made possible by the combined use of a macromolecular alkoxyamine initiator prepared previously during a first step conventionally described in the prior art, in the presence of a photoinitiator and the constituent monomers of the second block.

Among the monomers that may be used in the process of the invention, mention may be made, without implying any limitation, of monomers bearing one or more double bonds such as vinylaromatic monomers, for instance styrene or substituted styrenes, especially α-methylstyrene, acrylic monomers such as acrylic acid or salts thereof, alkyl acrylates (optionally containing several acrylic functions), cycloalkyl or aryl acrylates, such as methyl, ethyl, butyl, ethylhexyl or phenyl acrylate, hydroxyalkyl acrylates such as 2-hydroxyethyl acrylate, ether alkyl acrylates such as 2-methoxyethyl acrylate, alkoxy- or aryloxy-polyalkylene glycol acrylates such as methoxypolyethylene glycol acrylates, ethoxypolyethylene glycol acrylates, methoxypolypropylene glycol acrylates, methoxypolyethylene glycol-polypropylene glycol acrylates, or mixtures thereof, aminoalkyl acrylates such as 2-(dimethylamino)ethyl acrylate (DMAEA), fluoro acrylates, silyl acrylates, phosphorus acrylates such as alkylene glycol phosphate acrylates, methacrylic monomers such as methacrylic acid or salts thereof, alkyl methacrylates (optionally containing several methacrylic functions), cycloalkyl, alkenyl or aryl methacrylates such as methyl methacrylate (MMA), lauryl, cyclohexyl, allyl, phenyl or naphthyl methacrylate, hydroxyalkyl methacrylates such as 2-hydroxyethyl methacrylate or 2-hydroxypropyl methacrylate, ether alkyl methacrylates such as 2-ethoxyethyl methacrylate, alkoxy- or aryloxy-polyalkylene glycol methacrylates such as methoxypolyethylene glycol methacrylates, ethoxypolyethylene glycol methacrylates, methoxypolypropylene glycol methacrylates, methoxy-polyethylene glycol-polypropylene glycol methacrylates, or mixtures thereof, aminoalkyl methacrylates such as 2-(dimethylamino)ethyl methacrylate (DMAEMA), fluoro methacrylates such as 2,2,2-trifluoroethyl methacrylate, silyl methacrylates such as 3-methacryloylpropyltrimethylsilane, phosphorus methacrylates such as alkylene glycol phosphate methacrylates, hydroxyethylimidazolidone methacrylate, hydroxyethylimidazolidinone methacrylate, 2-(2-oxo-1-imidazolidinyl)ethyl methacrylate, acrylonitrile, acrylamide or substituted acrylamides, 4-acryloylmorpholine, N-methylolacrylamide, methacrylamide or substituted methacrylamides, N-methylolmethacrylamide, methacrylamidopropyltrimethylammonium chloride (MAPTAC), itaconic acid, maleic acid or salts thereof, maleic anhydride, alkyl or alkoxy- or aryloxy-polyalkylene glycol maleates or hemimaleates, vinylpyridine, vinylpyrrolidinone, (alkoxy) poly(alkylene glycol) vinyl ethers or divinyl ethers, such as methoxy poly(ethylene glycol) vinyl ether, poly(ethylene glycol) divinyl ether, olefinic monomers, among which mention may be made of ethylene, butene, hexene and 1-octene, and also fluoro olefinic monomers, and vinylidene monomers, among which mention may be made of vinylidene fluoride, alone or as a mixture of at least two abovementioned monomers.

The invention also relates to block or non-block polymers or copolymers, derived from the process obtained according to the process of the invention in the presence or absence of a host material.

The present invention also relates to the applications of the use of this low-temperature synthetic process. This process becomes compatible with numerous and varied applications for which the application temperature remains cold or moderate.

In particular, the present invention is advantageously suited to applications such as varnishes, 3D printing, coatings, bonding agents and adhesives, mechanical reinforcement of plastics and composite materials, since the polymerization temperature coincides with the application temperature.

The present invention also relates to host materials comprising polymers or copolymers derived from the process of the invention as a result of their unique properties resulting from the use of the process of the invention, making it possible especially to incorporate large amounts of copolymers that are the subject of the invention into the host materials using the process of the invention.

EXAMPLE 1

Synthesis of the Alkoxyamine DIAMINS 1.25 liters of ethanol, 300 g of Blocbuilder® (Arkema) and 100 g of butanediol diacrylate are placed in a 2.5 liter reactor. The mixture is heated with stirring at 80° C. for 4 hours. The reaction mixture is then discharged and the ethanol is evaporated off using a rotary evaporator. 480 g of DIAMINS are obtained quantitatively.

EXAMPLE 2

Synthesis of a Polyalkoxyamine

The following are placed in a 2 liter metal reactor equipped with an impeller stirrer, a jacket for heating by circulation of oil and a vacuum/nitrogen inlet:

301 g of butyl acrylate
49 g of styrene
7.7 g of DIAMINS.

After introducing the reagents, the reaction mixture is degassed three times under vacuum/nitrogen. The reactor is then closed and stirring (50 rpm) and heating (nominal temperature: 125° C.) are started. The temperature of the reaction mixture reaches 113° C. in about 30 minutes. The pressure stabilizes at about 1.5 bar. The reactor temperature is maintained at a stage of 115° C. for 522 min. After cooling, 340 g of a mixture with a solids content of 67% are recovered. The excess butyl acrylate is then removed by evaporation at 70° C. under reduced pressure for 3 hours. The butyl acrylate/styrene of the macroradical weight ratio obtained is 83/17. GPC analysis of block B gives the following results: Mn: 35 000 g/mol; $M_w$: 65 000 g/mol; polydispersity: 1.86.

EXAMPLE 3

Synthesis of the Alkoxyamine TRIAMINS 206 g of ethanol, 100 g of BlocBuilder® (Arkema) and 26.5 g of pentaerythritol triacrylate (Sartomer SR 444D) are placed in a 500 mL reactor. The mixture is heated with stirring at 80° C. for 4 hours. The reaction mixture is then discharged and the ethanol is evaporated off using a rotary evaporator. 126 g of TRIAMINS are obtained quantitatively.

EXAMPLE 4

Synthesis of the Macro-Initiator CS1

Synthesis of a Macro-Initiating Polyalkoxyamine DS1

The following are introduced into a 2-liter metal reactor equipped with an impeller stirrer, a jacket for heating by circulation of oil and a vacuum/nitrogen inlet:

643 g of butyl acrylate
96 g of styrene
6 g of TRIAMINS.

After introduction of the reagents, the reaction mixture is degassed via three vacuum/nitrogen flushes. The reactor is then closed and the stirring (50 rpm) and heating (nominal temperature: 125° C.) are started. The temperature of the reaction mixture reaches 113° C. in about 30 minutes. The pressure stabilizes at about 1.5 bar. The reactor temperature is maintained at a stage of 115° C. for 522 minutes. After cooling, 740 g of a mixture with a solids content of 70% are recovered. The excess butyl acrylate is then removed by evaporation at 70° C. under reduced pressure over 3 hours. The butyl acrylate:styrene weight ratio of the macro-radical obtained is 83:17. Analysis of the macro-initiator by GPC calibrated using polystyrene samples gives the following results: $M_n$: 129 000 g/mol; $M_w$: 510 000 g/mol; polydispersity: 3.9.

EXAMPLE 5

Synthesis of the Non-Initiating Copolymer (Polyalkoxyamine)

A mixture composed of 500 g of butyl acrylate, 70 g of styrene, 966 g of toluene, 0.1854 g of AIBN (Vazo64 from DuPont) and 0.6 g of n-dodecyl mercaptan are placed in a stirred stainless-steel reactor commonly used by those skilled in the art. The reactor is placed under a pressure of 2 bar of nitrogen and heated at a temperature of 85° C. for 3 hours. The mixture is then cooled to room temperature (20° C.) and then dried under vacuum in an oven for 16 hours at 125° C. and 100 mbar of absolute pressure. The dry non-initiating copolymer of polybutyl acrylate-co-styrene is then obtained.

EXAMPLE 6

Polymerization of Methyl Methacrylate Under UV at 25° C.

A mixture containing the macroinitiator or the non-initiating copolymer, the UV initiator Esacure TPO from the company Lamberti, and a methyl methacrylate monomer is prepared in a glass flask. The irradiation time is 90 min. The irradiation source is a UVAHAND250 lamp from the company Dr. Hönle AG UV Technology (Lochhamer Schlag 1, 82166 Gräfelfing/Munich, Germany). The initial temperature of the mixture is room temperature (20° C.)

The results are given in table 1; the percentages are mass percentages:

| Example | Macro-initiator CS1 | Non-initiating copolymer | UV initiator TPO | Methyl methacrylate | Observation |
|---|---|---|---|---|---|
| 6a | 0 | 0 | 0 | 100% | No polymerization |
| 6b | 0 | 0 | 3% | 97% | Transparent polymer |
| 6c | 0 | 15% | 3% | 82% | White opaque polymer |
| 6d | 15% | 0% | 0% | 85% | No polymerization |
| 6e | 15 | 0 | 3 | 82 | Transparent polymer |

Figure 1:
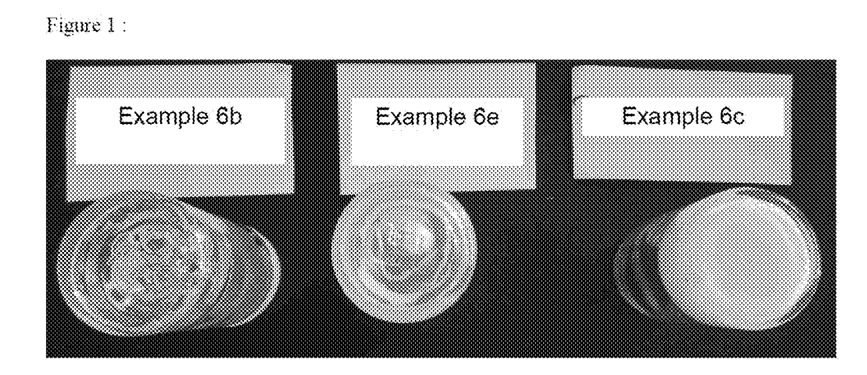
FIG. 1 is a photograph of the samples 6b, 6e and 6c from Example 6.

FIG. 1 gives photos of samples 6b, 6e and 6c.

Figure 2:
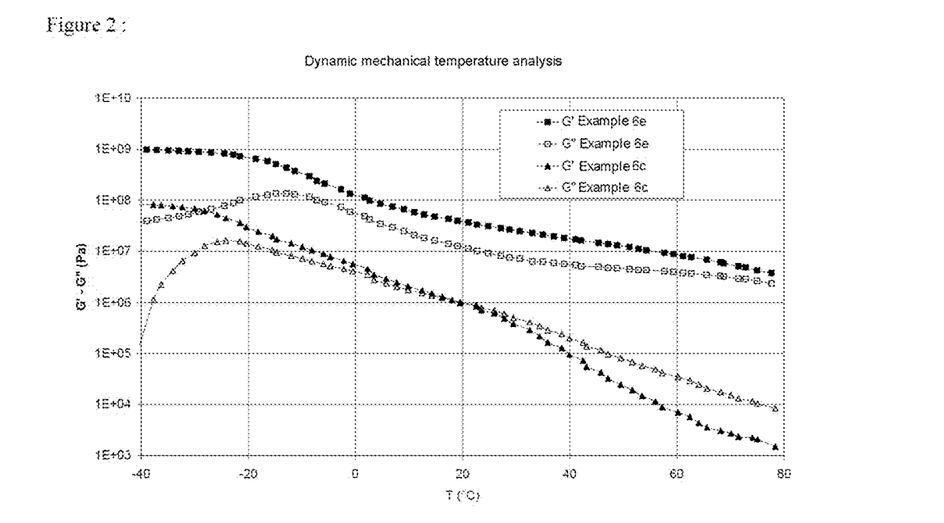
FIG. 2 shows a dynamic mechanical analysis (DMA) of the samples 6c and 6e from Example 6.

The dynamic mechanical analysis (DMA) in FIG. 2 clearly shows a difference in mechanical behavior between examples 6c and 6e. The material 6c has no mechanical strength, it flows at room temperature (20° C.), which is reflected by the increase in the modulus values G' and G" at 18° C. It may be concluded therefrom that it is not structured. On the other hand, the material 6e conserves good mechanical strength, which is reflected by a modulus value G' that is higher than the modulus value G" throughout the temperature range. It is concluded therefrom that it is structured.

EXAMPLE 7

Polymerization of Methyl Methacrylate Under UV at 0° C.

Example 6e is reproduced, but this time the glass flask rests on a bed of glycol-water at −15° C. The same result as for example 6e is observed, polymerization of the mixture and a transparent polymer are obtained.

EXAMPLE 8

Polymerization of Isobornyl Acrylate Under UV in the Presence of a Macroinitiator The macroinitiator used is that derived from example 2.
iBoA is isobornyl acrylate (the Tg of the homopolymer PiBoA is in the region of 100° C.). Speedcure TPO-L is ethyl (2,4,6-trimethylbenzoyl)phenylphosphinate, a liquid photoinitiator distributed by Lambson.

The mass composition given in table 2 below is homogenized with magnetic stirring at room temperature (20° C.) and then poured into a silicone mold (dimensions 40 mm long, 30 mm wide and 1 mm thick). The filled mold is then placed under UV-LED radiation (Firefly model distributed by Phoseon Technology, wavelength 395 nm, power 4 W/cm$^2$) for 40 seconds.

|  | Macroinitiator DS1 | iBoA | TPO-L |
|---|---|---|---|
| Example 8 | 2.61 g | 4.15 g | 0.07 g |

Figure 3:
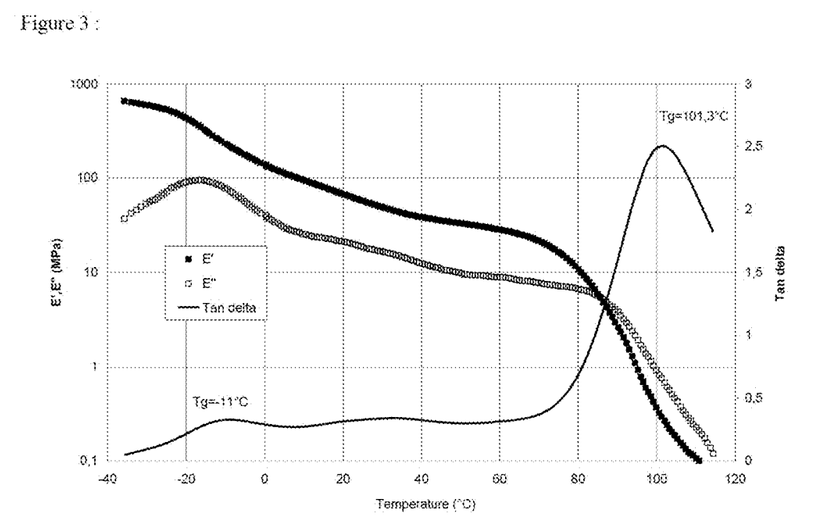
FIG. 3 shows a tensile dynamic mechanical analysis of a sample made by an embodiment of the invention.
Figure 4:
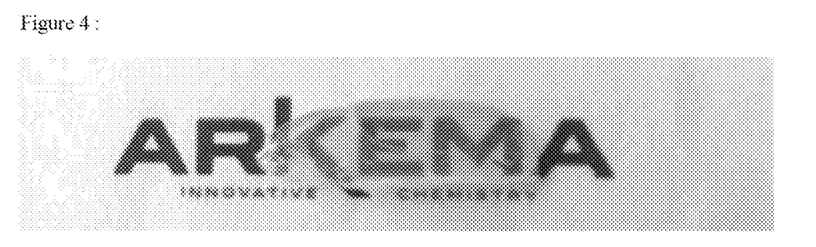
FIG. 4 is a photograph demonstrating the transparency of a sample made according to an embodiment of the invention.

The tensile dynamic mechanical analysis shows in FIG. 3 two glass transition temperatures corresponding to two distinct phases, one associated with the macro-initiating polymer (Tg −11° C.), the other with the polyisobornyl acrylate matrix (Tg 101° C.). Since the modulus value E' remains higher than the modulus value E" up to 80° C., it is deduced therefrom that the material is structured. The optical transparency indicates that this structuring is very fine (submicron scale), FIG. 4.

EXAMPLE 9

Polymerization of 2-(2-ethoxyethoxy)ethyl Acrylate Under UV in the Presence of a Macroinitiator The macroinitiator used is that derived from example 2.
SR256 is 2-(2-ethoxyethoxy)ethyl acrylate, distributed by Sartomer (the Tg of the homopolymer is in the region of −55° C.) Speedcure TPO-L is ethyl (2,4,6-trimethylbenzoyl)phenylphosphinate, a liquid photoinitiator distributed by Lambson.

The mass composition given in table 3 below is homogenized at room temperature (20° C.) and then deposited onto a glass slide. This slide is then placed under UV-LED radiation (Firefly model distributed by Phoseon Technology, wavelength 395 nm, power 4 W/cm$^2$) for 40 seconds.

|  | Macroinitiator DS1 | SR256 | TPO-L |
|---|---|---|---|
| Example 9 | 3.65 g | 8.49 g | 0.12 g |

Figure 5:
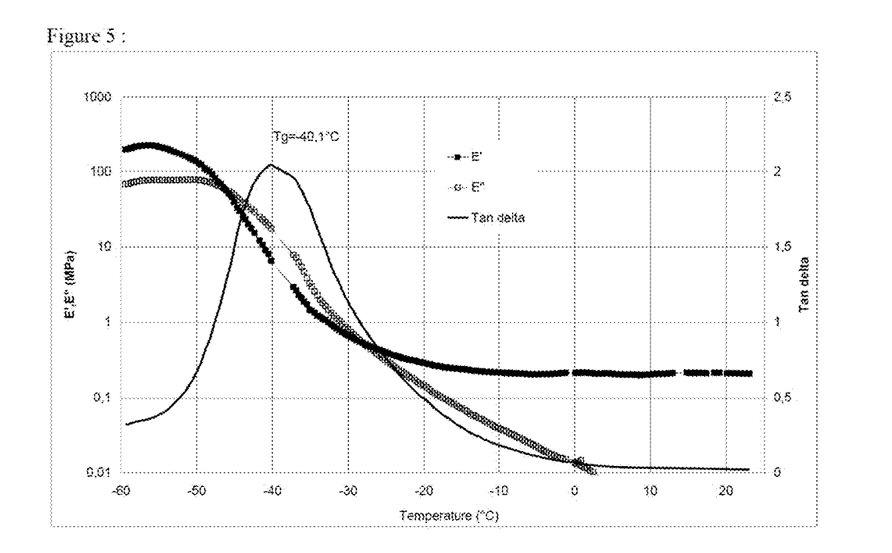
FIG. 5 shows a compressive dynamic mechanical analysis of a sample made by an embodiment of the invention.
Figure 6:
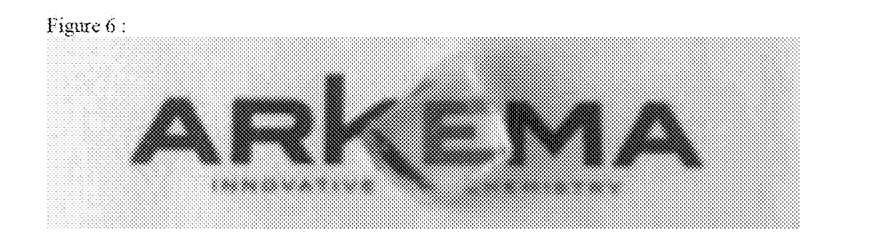
FIG. 6 is a photograph demonstrating the transparency of a sample made according to an embodiment of the invention.

Compressive dynamic mechanical analysis shows in FIG. 5 a glass transition temperature at −40° C. for the poly(2-(2-ethoxyethoxy) ethyl) acrylate. The elastic modulus E' remains higher than the modulus value E" after this glass transition at −40° C., which reflects the presence of structuring. Once again, the optical transparency of the sample confirms that the scale of the structuring is very fine, of submicron level (FIG. 6).

The invention claimed is:
1. A radical polymerization process comprising the steps of:
providing a mixture comprising at least one monomer, at least one photoinitiator, at least one alkoxyamine, and at least one additional initiator combined with the at least one photoinitiator, wherein the at least one additional initiator generates free radicals via a redox reaction;
polymerizing the mixture at a temperature of between −50° C. and 80° C.

2. The radical polymerization process according to claim 1, wherein the at least one alkoxyamine is monofunctional.

3. The radical polymerization process according to claim 1, wherein the at least one alkoxyamine is multifunctional.

4. The radical polymerization process according to claim 1, wherein the least one alkoxyamine is a macromolecular alkoxyamine.

5. A radical polymerization process comprising the steps of:
providing a mixture comprising at least one monomer, at least one photoinitiator, and at least one alkoxyamine;
polymerizing the mixture at a temperature of between −50° C. and 80° C., wherein the polymerization is performed in the presence of a host material that does not participate in the polymerization process, and wherein the host material comprises at least one material selected from the group consisting of woven fibers, nonwoven fibers, polyester resins, polyurethane resins and epoxy resins.

6. The radical polymerization process according to claim 5, wherein the mixture further comprises at least one additional initiator combined with the at least one photoinitiator, wherein the at least one additional initiator generates free radicals via a redox reaction.

7. The radical polymerization process according to claim 1, wherein the polymerization is performed in the presence of a host material that does not participate in the polymerization process.

8. The radical polymerization process according to claim 7, wherein the host material comprises at least one material selected from the group consisting of woven fibers, nonwoven fibers, polyester resins, polyurethane resins and epoxy resins.

9. The radical polymerization process according to claim 1 wherein the radical polymerization process is used to manufacture bonding agents, composite parts, varnishes, for coatings or 3D printed articles.

10. An article of manufacture, wherein the article is manufactured according to the radical polymerization process of claim 1.

11. An article of manufacture, wherein the article is manufactured according to the radical polymerization process of claim 7.

12. An article of manufacture, wherein the article is manufactured according to the radical polymerization process of claim 8.

13. The radical polymerization process according to claim 7, wherein the radical polymerization process is used to manufacture bonding agents, composite parts, varnishes, coatings, or 3D printed articles.

14. The radical polymerization process according to claim 8, wherein the radical polymerization process is used to manufacture bonding agents, composite parts, varnishes, coatings or 3D printed articles.

15. The radical polymerization process according to claim 5, wherein the mixture further comprises at least one additional initiator combined with the at least one photoinitiator, wherein the at least one additional initiator generates free radicals thermally.

16. The radical polymerization process according to claim 5, wherein the at least one alkoxyamine is monofunctional.

17. The radical polymerization process according to claim 5, wherein the at least one alkoxyamine is multifunctional.

18. The radical polymerization process according to claim 5, wherein the least one alkoxyamine is a macromolecular alkoxyamine.

19. The radical polymerization process according to claim 5, wherein the mixture further comprises at least one additional initiator combined with the at least one photoinitiator, wherein the at least one additional initiator generates free radicals thermally.

20. The radical polymerization process according to claim 5 wherein the radical polymerization process is used to manufacture bonding agents, composite parts, varnishes, for coatings or 3D printed articles.

21. An article of manufacture, wherein the article is manufactured according to the radical polymerization process of claim 5.

* * * * *